(12) United States Patent
Jiang et al.

(10) Patent No.: US 7,596,660 B2
(45) Date of Patent: Sep. 29, 2009

(54) SYSTEM AND METHOD FOR STORAGE SYSTEM

(75) Inventors: Xiaoming Jiang, Tokyo (JP); Satoshi Yagi, Tokyo (JP); Daisuke Mitsutake, Tokyo (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 452 days.

(21) Appl. No.: 11/654,064

(22) Filed: Jan. 16, 2007

(65) Prior Publication Data

US 2007/0136527 A1 Jun. 14, 2007

Related U.S. Application Data

(63) Continuation of application No. 11/234,554, filed on Sep. 23, 2005, now Pat. No. 7,181,571, which is a continuation of application No. 10/377,848, filed on Feb. 28, 2003, now Pat. No. 6,985,997.

(51) Int. Cl.
*G06F 12/00* (2006.01)
*G06F 13/00* (2006.01)

(52) U.S. Cl. .................. 711/114; 711/100; 711/154; 711/156

(58) Field of Classification Search .............. 711/100, 711/111, 112, 113, 114, 154, 156, 161, 162; 714/6, 766, 767
See application file for complete search history.

(56) References Cited

U.S. PATENT DOCUMENTS

| | | | |
|---|---|---|---|
| 5,712,970 A | | 1/1998 | Arnott et al. |
| 5,720,027 A | * | 2/1998 | Sarkozy et al. .................. 714/6 |
| 6,073,218 A | | 6/2000 | DeKoning et al. |
| 6,108,684 A | | 8/2000 | DeKoning et al. |
| 6,138,247 A | | 10/2000 | Mckay et al. |
| 6,195,727 B1 | * | 2/2001 | Islam et al. .................. 711/114 |
| 6,230,240 B1 | | 5/2001 | Shrader et al. |
| 6,247,099 B1 | * | 6/2001 | Skazinski et al. ........... 711/141 |
| 6,330,642 B1 | | 12/2001 | Carteau |
| 6,349,357 B1 | | 2/2002 | Chong |

(Continued)

FOREIGN PATENT DOCUMENTS

JP 08-328758 12/1996

(Continued)

OTHER PUBLICATIONS

Japan Patent Office (JPO) office action dated Mar. 4, 2008 for JPO application JP2002-056374.

(Continued)

*Primary Examiner*—Tuan V. Thai
(74) *Attorney, Agent, or Firm*—Townsend and Townsend and Crew LLP

(57) ABSTRACT

In a storage system including a plurality of data controllers that receive a data input/output request that is input via an external communication path and perform data input/output processing with respect to a storage resource in response to this request, the plurality of data controllers being connected by a data communication path and being able to communicate with one another, if a data input/output request has been input into one of the controllers, the plurality of data controllers and shares execution of the data input/output processing by communication through the data communication path.

12 Claims, 5 Drawing Sheets

U.S. PATENT DOCUMENTS

| | | |
|---|---|---|
| 6,378,039 B1 | 4/2002 | Obara et al. |
| 6,457,098 B1 | 9/2002 | DeKoning et al. |
| 6,681,339 B2 | 1/2004 | McKean et al. |
| 6,708,285 B2 | 3/2004 | Oldfield et al. |
| 6,766,491 B2 | 7/2004 | Busser |
| 6,842,829 B1 | 1/2005 | Nichols |
| 2003/0033477 A1 | 2/2003 | Johnson et al. |

FOREIGN PATENT DOCUMENTS

| | | |
|---|---|---|
| JP | 08-328758 A | 12/1996 |
| JP | 08-335144 A | 12/1996 |

OTHER PUBLICATIONS

Paul Massiglia, Feb. 1997, The RAID book, Sixth Edition, pp. 14-16.

Baek et al. "Reliability and Performance of Hierarchical RAID with Multiple Controllers," Proceedings of the Twentieth ACM Symposium on Principles of Distributed Computing, Aug. 2001, pp. 246-254 (2001).

Cao et al. "The TicketTAIP Parallel RAID Architecture," ACM Transactions on Computer Systems 12:236-269 (1994).

Japan Patent Office (JPO) office action dated Nov. 6, 2007 for JPO patent application JP2002-056374.

* cited by examiner

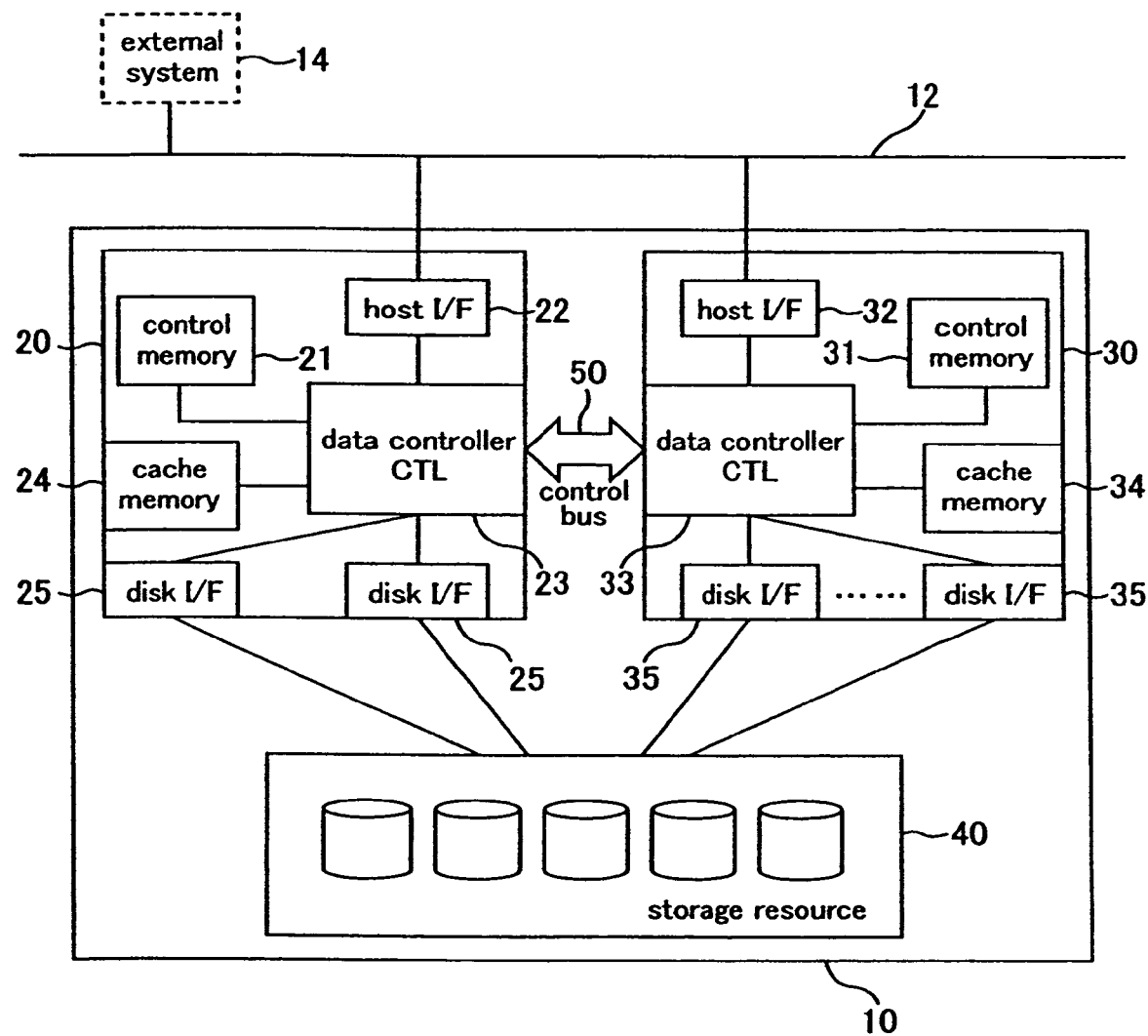
【Fig.1】

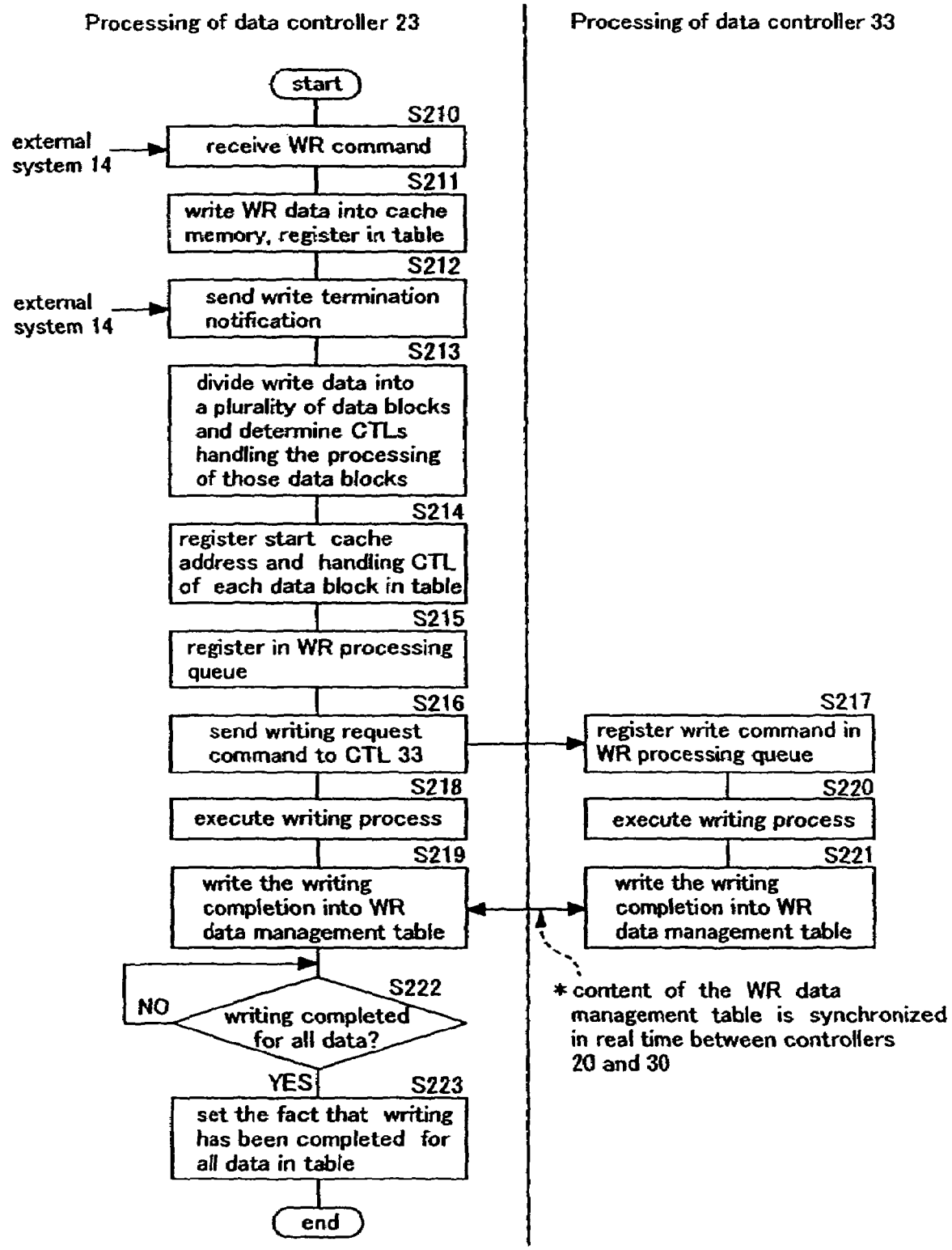
[Fig.2]

[Fig.3]

| external address | WR data ID | total completion flag | cache address | handling controller | completion flag | stripe or drive number | physical or logical address | controller handling parity |
|---|---|---|---|---|---|---|---|---|
| ...... | ...... | ...... | ...... | ...... | ...... | | | |
| C0034h | 2547 | 1 | 00216h | 0 | 1 | 12 | 01216h | 0 |
| | | | 00316h | 0 | 1 | | 01316h | |
| | | | 00416h | 1 | 1 | | 01416h | |
| | | | 00516h | 1 | 1 | | 01516h | |
| E6D14h | 2548 | | 01216h | 0 | 1 | 5 | 02216h | 1 |
| | | | 01316h | 0 | | | 02316h | |
| | | | 01416h | 1 | | | 02416h | |
| | | | 01516h | 1 | | | 02516h | |
| DD245h | 2549 | | 02216h | 0 | | 18 | 03216h | 0 |
| | | | 02316h | 0 | | | 03316h | |
| | | | 02416h | 1 | | | 03416h | |
| | | | 02516h | 1 | | | 03516h | |
| ...... | ...... | ...... | ...... | ...... | ...... | ...... | ...... | ...... |

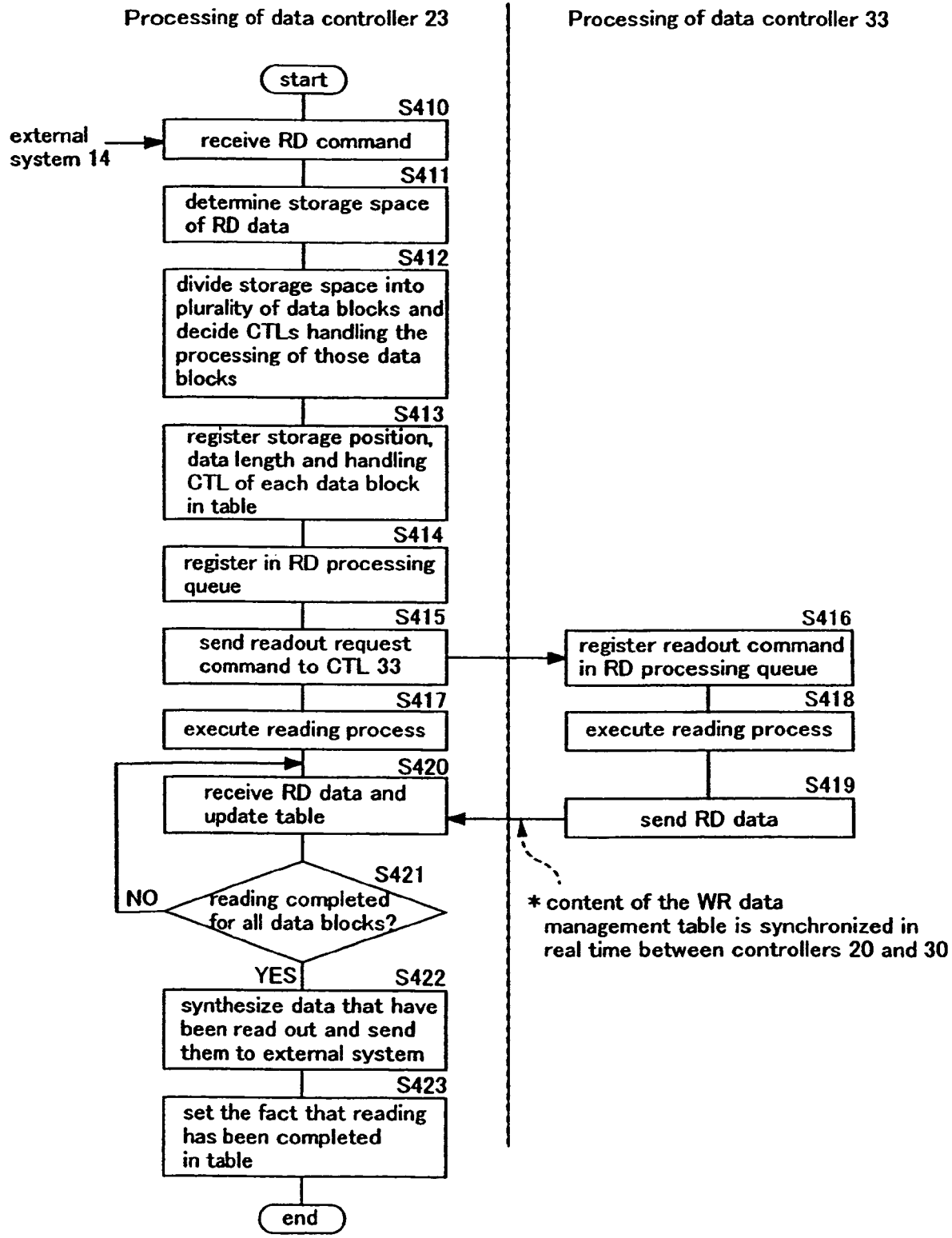
[Fig.4]

| external address | RD data ID | total completion flag | completion flag | data length | storage space | cache memory start address | handling controller |
|---|---|---|---|---|---|---|---|
| ...... | ...... | ...... | ...... | | ...... | ...... | ...... |
| A0034h | 2547 | 1 | 1 | 2048 | 00216h | 01216h | 0 |
| | | | 1 | | 00316h | 01316h | 0 |
| | | | 1 | | 00416h | 01416h | 1 |
| | | | 1 | | 00516h | 01516h | 1 |
| 16D14h | 2548 | | 1 | 512 | 01216h | 02216h | 0 |
| | | | | | 01316h | 02316h | 0 |
| | | | | | 01416h | 02416h | 1 |
| | | | | | 01516h | 02516h | 1 |
| 13245h | 2549 | | | 1024 | 02216h | 03216h | 0 |
| | | | | | 02316h | 03316h | 0 |
| | | | | | 02416h | 03416h | 1 |
| | | | | | 02516h | 03516h | 1 |
| ...... | ...... | ...... | ...... | | ...... | ...... | ...... |

【Fig.5】

SYSTEM AND METHOD FOR STORAGE SYSTEM

CROSS-REFERENCE TO RELATED APPLICATIONS

The present application claims priority upon Japanese Patent Application No. 2002-056374 filed on Mar. 1, 2002, which is herein incorporated by reference.

BACKGROUND OF THE INVENTION

1. Field of the Invention

The present invention relates to a storage system such as a disk array system, and a control method for the same, as well as to technology with which data input/output requests can be processed efficiently.

2. Description of the Related Art

In recent years, due to rapid advances in IT technology, there has been an increasing demand for storage systems of disk array systems or the like. In such disk array systems, internal systems are often configured redundantly with the object of improving reliability and increasing performance, and as disclosed for example in JP H8-328758A, a plurality of data controllers may be implemented that perform the data input/output processing for disk drives or other storage resources.

In disk array systems that are provided with redundant data controllers, data input/output processing that is accepted by one data controller is essentially handled by that data controller itself.

Therefore, even when a data input/output request is input from the outside into one data controller and then there is capacity for further processing in other data controllers, the processing for that data input/output request is not shared with other data controllers and the processing is essentially handled by the disk array controller that received the input.

SUMMARY OF THE INVENTION

The present invention is based on the above and other aspects, and one of its objects is to provide a storage system that can process data input/output requests efficiently, as well as a control method for the same.

One embodiment of the present invention that achieves the above and other objects is a storage system comprising a plurality of data controllers that receive a data input/output request that is input from an external communication path and perform data input/output processing with respect to a storage resource in response to this request, the plurality of data controllers being connected by a data communication path such that they can communicate with one another, where, if a data input/output request has been input into one of the controllers, the data controllers together execute the data input/output processing by communicating through the data communication path.

In this storage system, when a data input/output request that is input from the external communication path has been received, then the plurality of controllers together execute the data input/output processing with respect to the storage resource, so that a distribution of the load among the plurality of controllers is achieved, and the storage system can be operated with high efficiency, increasing the processing speed of the storage system.

To give a specific example, for example, when a data controller A of those data controllers receives a data write request as the data input/output request, then the data controller A writes a portion of the data to be written into the storage resource.

Then, the data controller A sends a data write request for another portion of the data to be written through the data communication path to another data controller B, and when this other data controller B has received this data write request, it executes the processing for this data write request.

Furthermore, if these data controllers manage the storage resource by one of the schemes of RAID 3 to 6, and the data controller A has received a data write request as the data input/output, then the data to be written are divided into writing units in accordance with of that one of the schemes of RAID 3 to 6, and each divided unit is assigned to the data controller that handles the respective writing process.

Consequently, if the storage resource of the storage system is operated by a RAID scheme, then the RAID configuration can be utilized to easily realize the configuration of the present invention.

Furthermore, it is also possible to select the data controller handling the parity calculation, and to let this data controller execute the parity calculation. Furthermore, it is also possible that for each stripe that is composed in the operation of the RAID scheme, the assignment of the parity calculation for that stripe to the data controller handling it is stored, and the data controller handling the parity calculation of the stripe to be written carries out the parity calculation of that stripe when writing the data into the storage system. Furthermore, the assignment of the data controller handling the parity calculation may also be changed dynamically. Moreover, the writing into the storage resource of the data that are written as one stripe composed in the operation of the RAID scheme may also be executed by a plurality of the controllers together.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 1 is a diagram showing the configuration of a storage system according to an embodiment of the present invention;

FIG. 2 is a flowchart illustrating the process flow of the data writing process in an embodiment of the present invention;

FIG. 3 is a diagram showing the WR data management table in an embodiment of the present invention;

FIG. 4 is a flowchart illustrating the process flow of the data reading process in an embodiment of the present invention; and FIG. 5 is a diagram showing the RD data management table in an embodiment of the present invention.

DETAIL DESCRIPTION OF EMBODIMENTS

At least the following matters will be made clear by the explanation in the present specification and the accompanying drawings.

===Configuration of Storage System===

FIG. 1 is the general configuration of a storage system 10 illustrated as an embodiment of the present invention.

The storage system 10 is connected through an external communication path 12, such as a LAN (local area network)

or a SAN (storage area network), to an external system 14 such as a host computer. A more specific example of the storage system 10 is for example a disk array system.

The storage system 10 shown in FIG. 1 comprises two controllers 20 and 30, and a storage resource 40 that is configured by a storage devices, such as disk drives. The storage resource 40 may be connected to the outside via a suitable interface.

The controllers 20 and 30 comprise a control memory 21, 31 in which various kinds of control information and/or preset information is stored, a host interface (host I/F) 22, 32 for connecting to the outside communication path 12, a data controllers 23, 33 (denoted as "CTL" in the following) that controls/executes the data input/output processing for the storage resource 40 in accordance with data input/output commands that are input through the external communication path 12 into the host interface 22, 32, a cache memory 24, 34, and a disk interface (disk I/F) 25, 35, which operates in accordance with a certain communication standard such as SCSI and which is an input/output interface between the data controller 23, 33 and the storage resource 40.

The controller 20 and the controller 30 are connected by a control bus 50, which is a data communication path. The data controllers 23 and 33 receive data input/output instructions that are input through the host interfaces 22 and 32, and have the function to execute the processing for the data input/output with respect to the storage resource 40 as well as the function to send data input/output instructions and data via the control bus 50 to the other data controller.

===Writing Process===

FIG. 2 is a flowchart illustrating the process flow that is performed in the storage system 10 when the controller 20 has received a data write command (referred to as "WR command" in the following) that has been output from the external system 14 and input through the external communication path 12.

After the WR command received by the storage system 10 has been input into the host interface 22, it is interpreted by the CPU, and then the CPU inputs a corresponding command into the CTL 23 (S210). The CTL 23 writes into the cache memory 24 the data to be written ("WR data" in the following) that are input through the external communication path 12 together with the WR command, and registers the WR command ID that has been given to this WR command in a WR data management table as shown in FIG. 3, which is stored in the control memory 21 (S211).

A WR data management table is also stored in the control memory 31 of the controller 30, and the content of both WR data management tables is synchronously updated in real time by communication between the controllers 20 and 30 through the control bus 50.

It should be noted that it is also possible to adopt a configuration in which the WR data management table is stored only in either one of the control memories 21 and 31, and the controller in which it is not stored sends inquiries through the control bus 50 to the controller where it is stored.

After the above-described registration, the storage system 10 sends a write completion notification to which an external address (this is the information specifying the data managed by the storage system 10 when the external system 14 issues a data input/output request to the storage system 10, and in UNIX (reg. trademark) type systems, this is the ID number (tag) attached to the command that is sent from the external system 14) has been attached through the external communication path 12 to the external system 14 (S212).

Then, the CTL 23 divides the WR data that are stored in the cache memory 24 into a plurality of data blocks, and the CTL 23 or 33 handling the process of writing into the storage resource 40 is assigned to each of the divided data blocks (S213). Here, an algorithm in which the size of the data blocks is fixed or an algorithm in which the real-time processing load of the CTLs 23 and 33 is taken as a parameter are given as examples of those for determining how the WR data are divided (such as the number of data blocks or the size of data blocks). Furthermore, an algorithms in which the data amount to be processed is assigned such that the data amount is substantially balanced or an algorithms in which the data amount is assigned dynamically in accordance with the load state of the CTLs 23 and 33 are given as examples of those assigning the CTL for handling the processing of the data blocks.

The CTL 23 takes the start address, in the cache memory 24, of the data blocks generated by dividing the WR data, as well as identifiers indicating the CTLs that is to handle the processing of the data blocks, and registers them in the WR data management table in association with the WR command ID (S214).

Then, the CTL 23 reserves space in the storage resource 40 in which the data of the data blocks are stored. Here, this reservation of space is performed with reference to a resource management table that indicates the usage conditions of the storage resource 40. This table may be managed by the control memory 21 or the cache memory 24.

The reserved space is designated, using, for example, a physical address that specifies a drive number of the disk drives constituting the storage resource 40 or a storage location on the disk drives. Furthermore, if the storage resource 40 is operated with a scheme of RAID (redundant array of inexpensive disks) 3 to 6, then that space is designated by an ID designating a stripe across a plurality of disk drives and a logical address that specifies the storage position on the stripe. It should be noted that there is no limitation to the schemes of RAID 3 to 6, and other schemes that stripe across drives are also suitable.

As is well known in the art, a stripe is a group that is created when one set of data is to be written into several physical drives after being divided into units such as bytes, words or blocks (usually multiples of sectors) or the like (such units are referred to as "writing units" in the following), that is, the stripe is a group that corresponds to the set of data having been divided. And in the case of a scheme that uses a parity calculation, parity calculation is performed with that group as a unit. This group is often called a RAID group.

The CTL 23 associates each data block with information specifying the space that is reserved for the data block, and registers that information in the WR data management table.

When the space has been reserved, the CTL 23 registers the write command for the data blocks that it handles itself in a WR processing queue that is stored in the control memory 21 (S215). Moreover, the CTL 23 sends through the control bus 50 to the CTL 33 a writing request command for writing the data blocks whose processing is handled by the CTL 33 into the storage resource 40 (S216).

When the CTL 33 receives this writing request command, it refers to the WR data management table in the control memory 31, and registers the write commands for the data blocks whose writing it handles itself in a WR processing queue (not shown in the drawings) that is stored in the control memory 31 (S217).

At a suitable timing, the CTL 23 executes the process of writing data into the storage resource 40 for WR command IDs that are registered in the WR processing queue of the control memory 21 (S218). Then, the CTL 23 sets a flag, indicating the fact that writing has been completed, in those "completion flag" fields in the WR data management table stored in the control memory 21 corresponding to the data blocks for which the writing has been completed (S219).

On the other hand, the CTL 33 also executes at a suitable timing the process of writing data into the storage resource 40 for WR command IDs that are registered in the WR processing queue of the control memory 31 (S220).

It should be noted that the data of the data blocks to be written are requested by the CTL 33 to the CTL 23 through the control bus 50 at the time of execution of the writing process, or received by the CTL 33 through the control bus 50 from the CTL 23 and stored in the cache memory 34 in advance. Furthermore, if the CTLs 23 and 33 are provided with the function to simultaneously write into the two cache memories 24 and 34, then it is also possible that the CTL 23 sends the data via the control bus 50 to the CTL 33 when it writes the data into the cache memory 24, so that writing of the data into the cache memory 34 is synchronously performed by the CTL 33.

The CTL 33 sets a flag indicating the fact that writing has been completed in those "completion flag" fields of the WR data management table corresponding to the data blocks for which the writing process has been completed (S221). The CTL 23 monitors whether, together with the data blocks whose writing it handles itself, the completion flags indicate that writing has been terminated for all data blocks associated with the WR command (S222), and if this is affirmed, then it sets a flag in the "total completion flag" field of that WR command of the table, indicating that the writing of the WR data has been finished for that WR command (S223).

In this manner, the processing of the WR command received from the external system 14 is finished. Thus, with this processing, the writing process for one set of WR data is performed by two data controllers. Therefore, a distribution of the load is achieved and efficient utilization of resources is accomplished, especially if the processing load of one controller is large and the processing load of the other one is small.

Furthermore, the processing performance of the storage system 10 is improved by accomplishing load distribution between the CTLs in this manner. In particular, as more and more high-speed host interfaces enter the market nowadays, low processing speeds of the disk interface lead to bottlenecks, and often affect the processing speed of the storage system 10, and in these cases, the configuration of the present invention is effective.

With the schemes of RAID 3 to 6, the data are divided into writing units of bytes, words or blocks (usually multiples of sectors) or the like, and the data are distributed and written into a plurality of disk drives in these units. Thus, if the storage resource 40 is operated with a RAID scheme, then the aforementioned data blocks may also be in units of bytes, words or blocks, corresponding to the RAID scheme that is employed to operate the storage resource 40.

Moreover, it is also possible that, in the process of writing into the storage resource 40 the data that are written as one stripe formed when operating the storage resource 40 with the RAID scheme, the writing on the disk drives serving as the writing target is executed by a plurality of CTLs.

Furthermore, in managing the storage resource 40 with the scheme of RAID 3 to 6, a parity calculation is required and is ordinarily handled by the CTLs 23 and 33. Thus, it is also possible that for the parity calculation, the CTL 23 or 33 that handles the parity calculation is assigned dynamically, for example by examining the load state of the CTLs and, according to the result, determining the CTL that performs the parity calculation.

Moreover, some storage systems 10 that operate the storage resource 40 with a RAID scheme are configured so that a certain CTL is made to handle the processing of the parity disk drive in the stripe to be the writing target at the aim of load distribution. Thus, in such a storage system 10, if one of the CTLs receives a WR command from the external system, it is also possible to let the CTL handling the parity calculation of the parity disk drive of the stripe, which is to be the writing target for this WR command, execute the parity calculation.

More specifically, when the CTL on the side that has received the WR command attempts to write the data corresponding to that WR command into the storage resource 40, the CTL examines which CTL handles the parity calculation for the parity drive in the stripe to be the write target. If it turn out to handle it itself, then that CTL performs the parity calculation, and if it is turn out not to handle it itself, then it sends the necessary information and instructions for the parity calculation via the control bus 50 to the CTL to handle it and makes the CTL execute the parity calculation. With this configuration, it is possible to distribute the load more thoroughly and operate the storage system 10 more efficiently.

It should be noted that in schemes in which the disk for parity storage is not determined statically, such as in RAID 5, the parity disk drive of the stripe to be the writing target changes dynamically (for example every time when a unit of data is written), but in this case, also the CTL to handle the processing of the parity drives changes dynamically.

In the above explanations, the WR data management table is stored in the control memory 21 of the CTL 23, but it may also be stored in both control memories 21 and 31 of the CTLS 23 and 24 and those tables may be updated in real time via the control bus 50.

===Reading Process===
FIG. 4 is a flowchart illustrating the process flow that is performed in the storage system 10 when the controller 20 has received a data read command (referred to as "RD command" in the following) that is output from the external system 14 and input through the external communication path 12.

After the RD command received by the storage system 10 has been input into the host interface 22, it is interpreted by the CPU, and then the CPU inputs a corresponding command into the CTL 23 (S410). The CTL 23 assigns the RD command its own RD command ID, and registers the external address sent attached to this RD command as well as the data length of the data to be read (referred to as "RD data" in the following) in an RD data management table as shown in FIG. 5, which is stored in the control memory 21, in association with the assigned RD command ID.

The RD data management table is also stored in the control memory 31 of the controller 30, and the content of both RD data management tables is synchronously updated in real time by communication between the controllers 20 and 30 through the control bus 50. It should be noted that it is also possible to adopt a configuration in which the RD data management table is stored only in either one of the control memories 21 and 31, and the controller in which it is not stored sends inquiries through the control bus 50 to the controller where the table is stored.

Next, the CTL 23 refers to a conversion table (not shown in the drawings) which is stored in the control memory 21 and stores the correspondence between external addresses (for example, LBA (logical block address) and storage position designation information (disk drive number (or stripe ID) and physical address (or logical address in the stripe) in the storage resource 40), and examines the storage space in the storage resource 40 in which the RD data are stored from the external address that is sent attached to the RD command and the data length (S411). It should be noted that the conversion table may be formed into one table with the resource management table described above.

Next, the CTL 23 divides the above-mentioned storage space of the RD data into a plurality of data blocks, and determines, for each of the data blocks, the CTL that handles the process of reading out the data (S412). Methods for determining the CTL in charge include, for example, the method of allotting the processing to the CTLs at a predetermined ratio, the method of determining the CTLs in accordance with the load state of the CTLs 23 and 33, and the method of assigning the CTLs in accordance with a predetermined algorithm. The CTL 23 registers in the RD management table the storage position (for example, start address on the disk drive or logical address on the stripe) and the data length of each of the generated data blocks, and the identifier indicating the CTL to handle the processing of the data blocks (S413).

Next, the CTL 23 registers the data readout commands for the data blocks for which it handles the readout itself in an RD processing queue (not shown in the drawings) that is stored in the control memory 21 (S414). Furthermore, the CTL 23 sends through the control bus 50 a command requesting the readout of the data blocks handled by the CTL 33 (S415). This readout instruction command includes information specifying the storage space in the storage resource 40 in which those data blocks are stored (for example, readout start position and data length of the data block). When the CTL 33 receives the readout request command, it registers it in the RD processing queue that is stored in the control memory 31 (S416).

The CTL 23 executes the RD command that has been set in the RD processing queue at a suitable timing (S417), and stores the data that have been read out from the corresponding data block in the cache memory 24. It should be noted that in this situation, the CTL 23 registers the start address in the cache memory 24 in which the data read out from the data blocks are stored in the RD data management table in the control memory 24. Furthermore, it sets a flag indicating the fact that the readout of those data blocks has been completed in the "completion flag" fields that correspond to those data blocks in the RD data management table.

On the other hand, the CTL 33 sequentially executes the RD commands which are registered in the RD processing queue (S418), and stores the data that have been read out in the cache memory 34. Furthermore, the CTL 33 sends the data that is stored in the cache memory 34 via the control bus 50 to the CTL 23 (S419). It should be noted that information specifying to which of the above-mentioned data blocks the data correspond (for example, the ID attached to each data block) is attached to the data that are sent.

The CTL 23 stores the data that is sent from the CTL 33 in the cache memory 24 (S420). On the other hand, by referring to the RD data management table, the CTL 23 monitors whether the reading out of the data corresponding to all data blocks of the RD command has been completed (S421). Then, if the reading out of the data corresponding to all data blocks has been completed, the CTL 23 sends the data corresponding to the data blocks, which are written into the cache memory 24, through the external communication path 12 to the external system 14 (S422). It should be noted that, if necessary, the external address or the like may be attached to these data.

Furthermore, a flag indicating the fact that the reading for that RD command has been completed is set in the "total completion flag" field of that RD command in the RD data management table (S423).

Thus, the reading process is completed.

As explained for the writing process, also in the case of a reading process, it is possible to divide the data block units into units of bytes, words or blocks, in accordance with the RAID scheme that is employed to operate the storage resource 40.

Moreover, in the data reading process explained above, if data to be read out are left in the cache memories 24 and 34, then it is also possible to compose the RD data using the data in the cache memories 24 and 34, instead of reading them out from the storage resource 40.

===Other Considerations===

The foregoing explanations were for the case that the storage system 10 is provided with two data controllers, but the present invention can also be expanded to the case of three or more data controllers.

It should be noted that the CTL 23 can execute the readout commands that are set in the WR processing queue or the RD processing queue in parallel to other processes, and the commands that are set in the WR processing queue or the RD processing queue can be executed in parallel to sending write request commands or readout request commands to the CTL 33.

Although the preferred embodiment of the present invention has been described in detail, it should be understood that various modifications, substitutions and alterations can be made therein without departing from spirit and scope of the inventions as defined by the appended claims.

What is claimed is:

1. A method for load distribution among a plurality of data controllers that receive a data input/output request from an external communication path and perform data input/output processing with respect to a storage resource in response to the data input/output request, the plurality of data controllers being connected by a data communication path and being able to communicate with each another, the method comprising:
   receiving, at a first data controller from among the plurality of data controllers, the data input/output request;
   performing, at the first data controller, input/output operations with the storage resource on data associated with the data input/output request; and
   performing, at a second data controller from among the plurality of data controllers, parity calculations for the data associated with the data input/output request,
   the first data controlled further determining whether or not it is designated to perform the parity calculation,
   wherein if the first data controller is designated to perform the parity calculation, then the first data controller and the second data controller are the same data controller,
   wherein if the first data controller is not designated to perform the parity calculation, then the first data controller is different from the second data controller.

2. The method of claim 1, wherein if the first data controller is not designated to perform the parity calculation, then providing information to the second data controller to perform the parity calculation.

3. The method of claim 1, wherein the second data controller is a predetermined data controller from among the plurality of data controllers other than the first data controller.

4. The method of claim 1, wherein for a subsequent data input/output request, a third data controller performs parity calculations on data associated with the subsequent data input/output request, the third data controller being different from the second data controller.

5. The method of claim 1 wherein the storage resource is configured as a RAID storage group.

6. The method of claim 1 wherein the storage resource is configured as one of a RAID 3 storage group, a RAID 4 storage group, a RAID 5 storage group, or a RAID 6 storage group.

7. A storage system comprising:
a storage resource;
a plurality of disk controllers, each configured to perform I/O operations with the storage resource; and
a control bus providing connection among the disk controllers,
wherein in response to receiving a data input/output request:
 a first disk controller from among the disk controllers performs input/output operations with the storage resource on data associated with the data input/output request; and
 a second disk controller from among the disk controllers performs parity calculations for the data associated with the data input/output request,
wherein the first data controller determines whether or not it is designated to perform the parity calculation,
wherein if the first data controller is designated to perform the parity calculation, then the first data controller and the second data controller are the same data controller,
wherein if the first data controller is not designated to perform the parity calculation, then the first data controller is different from the second data controller.

8. The storage system of claim 7 wherein if the first data controller is not designated to perform the parity calculation, then the first data controller provides information via the control bus to the second data controller so that the second data controller can perform the parity calculation.

9. The storage system of claim 7 wherein the second data controller is a predetermined data controller from among the data controllers.

10. The storage system of claim 7 wherein for a subsequent data input/output request, a third data controller performs parity calculations on data associated with the subsequent data input/output request, the third data controller being different from the second data controller.

11. The storage system of claim 7 wherein the storage resource is a RAID storage system.

12. The storage system of claim 7 wherein the storage resource is a RAID storage system of one of RAID level 3, or RAID level 4, or RAID level 5, or RAID level 6.

* * * * *

UNITED STATES PATENT AND TRADEMARK OFFICE
CERTIFICATE OF CORRECTION

PATENT NO. : 7,596,660 B2
APPLICATION NO. : 11/654064
DATED : September 29, 2009
INVENTOR(S) : Jiang et al.

It is certified that error appears in the above-identified patent and that said Letters Patent is hereby corrected as shown below:

On the Title Page:

Please add:
Item -- (30)   Foreign Application Priority Data,
        March 1, 2002   (JP) ............ 2002-056374 --

Signed and Sealed this

Seventh Day of September, 2010

David J. Kappos
*Director of the United States Patent and Trademark Office*